United States Patent [19]

Osaka et al.

[11] Patent Number: 4,750,804
[45] Date of Patent: Jun. 14, 1988

[54] OPTICAL FIBER CONNECTING JIG

[75] Inventors: Keiji Osaka; Yuichi Usui; Tooru Yanagi, all of Yokohama, Japan

[73] Assignee: Sumitomo Electric Industries, Ltd., Osaka, Japan

[21] Appl. No.: 872,937

[22] Filed: Jun. 11, 1986

[30] Foreign Application Priority Data

Nov. 5, 1985 [JP] Japan .................... 60-170612[U]

[51] Int. Cl.⁴ .................................. G02B 6/38
[52] U.S. Cl. ...................... 350/96.21; 350/96.22
[58] Field of Search .............. 350/96.20, 96.21, 96.22

[56] References Cited

U.S. PATENT DOCUMENTS 4,165,914  8/1979  Villarruel et al. .......... 350/96.2 X
4,265,514  5/1981  Wellington et al. .......... 350/96.21

FOREIGN PATENT DOCUMENTS 3409920  9/1985  Fed. Rep. of Germany ... 350/96.21
0119059  10/1978  Japan .......................... 350/96.21

Primary Examiner—John Lee
Assistant Examiner—John Ngo
Attorney, Agent, or Firm—Cushman, Darby & Cushman

[57] ABSTRACT

Disclosed is an optical fiber connecting jig that is particularly useful in connecting single core optical fibers to other single core fibers and to multiple core fibers. A base and top cover are hinged to permit the top cover to open and close. The base is grooved to hold optical fibers and glass means.

5 Claims, 3 Drawing Sheets

OPTICAL FIBER CONNECTING JIG

BACKGROUND OF THE INVENTION

This invention relates in general to the art of optical fibers. It provides a connecting jig for use in connecting separate optical fiber sections to one another. The jig, according to the invention, prevents optical fibers from moving along their "long" direction during the connecting process.

Heretofore, connecting jigs have been used when multi-core optical fiber sections were connected to one another by fusion welding. The fusion welding procedure includes the steps of: removing covers from end portions of optical fiber core wires, clamping the optical fiber core-wires on optical fiber means with mirror-finished end faces in the connecting jig and setting the jig on the stage of a fusion welder. (See Japanese Pat. Appln No. 60-52957, the information in which is incorporated herein by reference). That has been most effective means known heretofore for fusion-welding multi-core optical fibers.

FIG. 6 is a perspective view of such a connecting jig (proposed by the inventors of the now claimed invention and not constituting prior art) for fusion-welding multi-core optical fiber core wires. The connecting jig comprises a top cover 22 and a base 21 having a long groove 24 for containing multi-core optical fiber core wires in its central section. Base 21 and top cover 22 are jointed to allow the top cover to pivot open and shut. The ends of the optical fiber core wires are contained in the long groove 24 and then top cover 22 is turned back to connect the wires.

There will be considered, with reference to FIGS. 7A), 7(B) and 7(C) the following cases where optical fibers are connected using such a multi-core fusion welder.

(A) A plurality of single-core optical fibers;
(B) A plurality of single-core optical fiber core wires and a single or plurality of multi-core optical fiber core wires; and
(C) A single or plurality of multi-core optical fiber core wires and a single or plurality of multi-core optical fiber core wires.

In FIGS. 7(A), 7(B) and 7(C), there are shown connecting jigs 31, single-core optical fiber core wires 32, optical fiber glass means 33 and multi-core optical fiber core wires 34.

Of the above-described cases (A), (B) and (C), the connecting jig shown in FIG. 6 is usable for connecting multi-core optical fiber core wires of the type shown in FIG. 7(C). However, the problem is that such a connecting jig (as shown in FIG. 6) can not be used to connect a plurality of single-core optical fiber core wires 32 as in cases (A), (B), discussed above.

SUMMARY OF THE INVENTION

The present invention solves the aforementioned problem. It provides an optical fiber connecting jig capable of connecting a plurality of optical fibers. It includes a top cover and a base, each having grooves for containing a plurality of single-core optical fiber core wires and optical fiber glass means communicating with the grooves in their "long" direction. The base and top cover are jointed in such a manner as to allow the top cover to pivot.

DETAILED DESCRIPTION OF PREFERRED EMBODIMENTS

Figure 1:
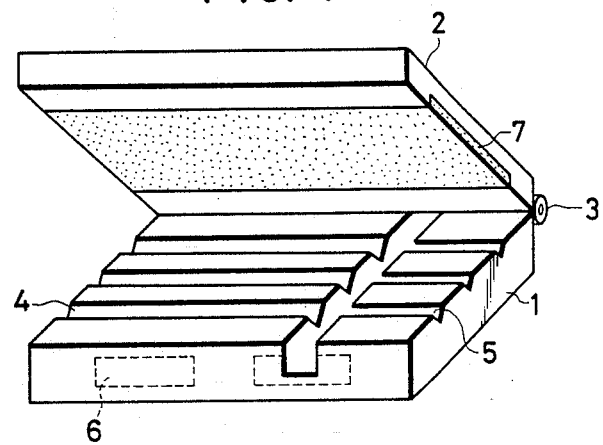
FIG. 1 is a perspective view of an embodiment of a connecting jig, according to the present invention, shown with its top cover open.

FIG. 1 is a perspective view of one embodiment of a connecting jig in accordance with the principles of the present invention. It is shown with its top cover 2 open.

Figure 2A:
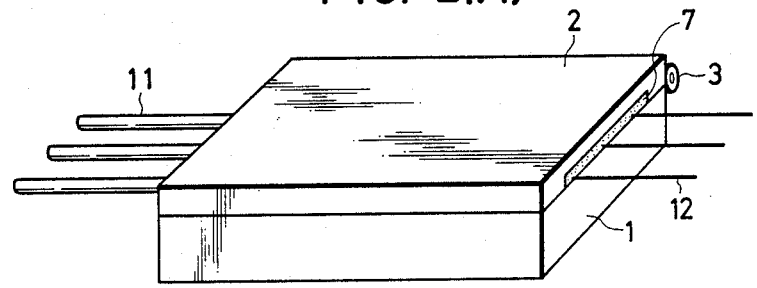
FIG. 2(A) is a perspective view of the FIG. 1 connecting jig with a plurality of single-core optical fiber core wires mounted thereon, shown with the top cover closed.

FIG. 2(A) is a perspective view of the connecting jig of FIG. 1 with a plurality of single-core optical fiber core wires mounted thereon and the top cover closed.

Figure 2B:
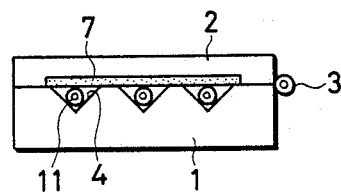
FIGS. 2(B) and 2(C) are respectively left and right side views of the FIG. 2(A) jig.
Figure 2C:
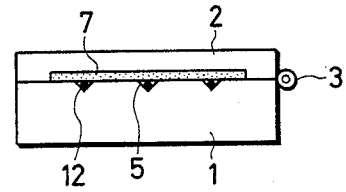

FIG. 2(B) is a left side view and a FIG. 2(C) is a right side view of the connecting jig.

In FIGS. 1 and 2(A), 2(B) and 2(C), the connecting jig comprises a base 1 and a top cover 2, both parts being jointed with a flexible device 3 such as, for example, a hinge allowing the top cover to pivot. Base 1 is provided with grooves 4 for respectively, containing single-core optical fiber core wires 11 and grooves 5 for containing optical fiber glass means 12 whose covers at the ends have been removed to expose the ends, the grooves 4, 5 communicating with each other in the "long" direction of the optical fibers. A permanent magnet 6 is buried in base 1 and an element of magnetic material such as iron is contained in top cover 2 at a position corresponding to that of magnet 6. Alternatively, top cover 2 is made of a metal or magnetic material so that base 1 and the top cover 2 may firmly be united. Moreover, an elastic high friction resistant material 7 such as rubber is provided in the inner surface of the top cover 2 so that the movement of the optical fiber core wires 11 in the longer direction may be reduced further.

Figure 3:
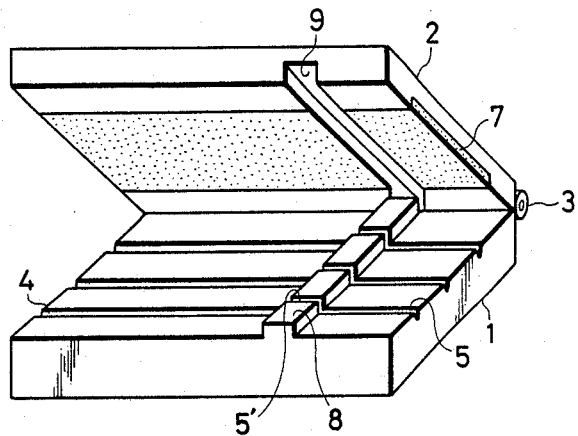
FIG. 3 is a side view of another embodiment of a connection jig according to the present invention.

FIG. 3 is a perspective view of another embodiment of a connecting jig according to the principles of the present invention. Core wire stoppers 8 are provided within the boundary between grooves 4 for containing the single-core optical fiber core wires 11 and grooves 5 for containing optical fiber glass means 12 in the connecting jig of FIG. 1, the core wire stoppers 8 respectively having grooves 5' allowing not the optical fiber core wires 11 but the optical fiber glass means 12, both left- and right-hand grooves 4, 5 communicating with each other through the grooves 5'.

Figure 4A:
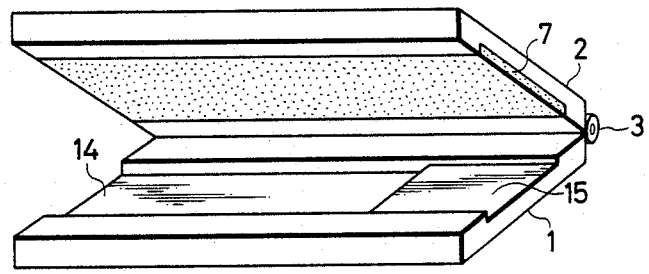
FIG. 4(A) is a perspective view of still another embodiment of a connecting jig according to the present invention shown with its top cover is open.
Figure 4B:
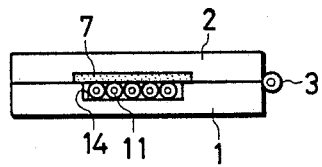
FIGS. 4(B) and 4(C) are respectively left and right side views of the embodiment shown with optical fibers mounted therein.
Figure 4C:
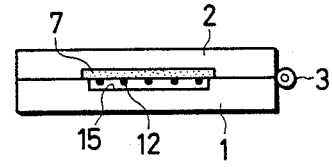

FIG. 4(A) is a perspective view of another embodiment of a connecting jig according to the principles of the present invention. It shows a perspective view of top cover 2 while it is open. FIG. 4(B) and 4(C) are respectively left and right side views of the connecting jig of FIG. 4(A) wherein the optical fiber core wires are mounted and thereon and then the top cover is closed. According to this embodiment, there are provided grooves 14, 15 not for respectively containing a plurality of single-core optical fiber core wires 11 but collectively containing wires 11 arranged in parallel.

Figure 5:
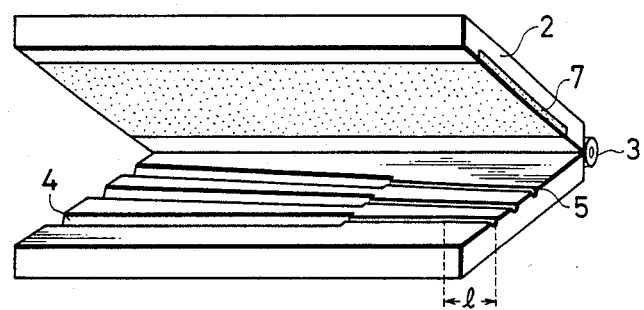
FIG. 5 is a perspective view of still another connecting jig according to the present invention.
Figure 6:
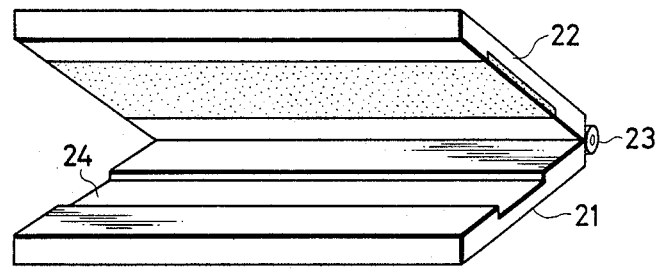
FIG. 6 is a perspective view of an example of the multi-core optical fiber core wire connection jig proposed by the present inventors.
Figure 7A:
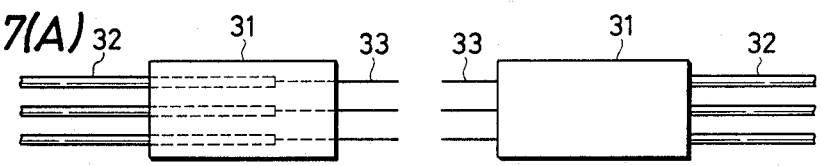
FIGS. 7(A)–7(C) illustrate optical fiber core wires being connected.
Figure 7B:
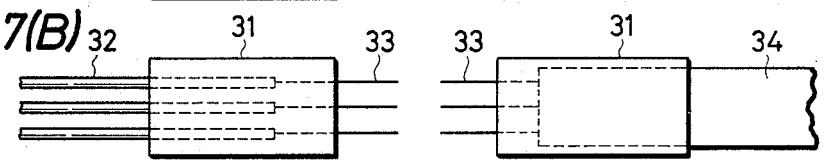
Figure 7C:
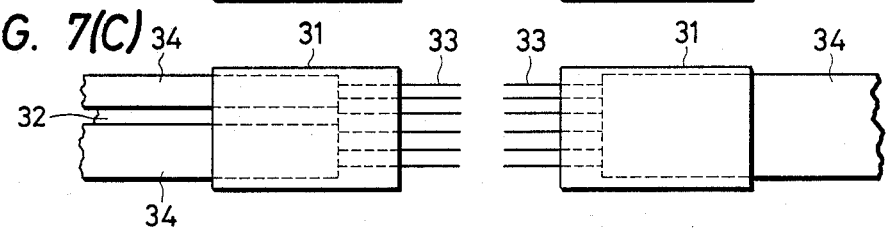

FIG. 5 is a perspective view of still another embodiment of a connecting jig according to the principles of the present invention. This connecting jig is particularly useful when the diameter of a single-core optical fiber core wire is greater than the pitch of the glass means of a multi-core optical fiber core wire to which the former is connected. In that case, there must be formed at least parallel grooves for containing the optical fiber glass means in the end portions 1 of the grooves.

The connecting jig according to the present invention will allow not only the collective connection of a plurality of single-core optical fiber core wires but also various combinations of single- and multi-core optical fiber core wires.

The invention has been described with reference to various specific embodiments. However, the invention, as defined by the claims is not limited to the specific embodiments described. Other embodiments based on the principles of the invention are possible. Such variations are intended to be within the scope of the claims.

What is claimed is:

1. An optical fiber connecting jig for connecting a plurality of optical fibers, comprising:
   a base member having one or more first grooves with a first diameter and a corresponding aligned number of second grooves with a second diameter defined in an upper surface thereof;
   a top cover having an elastic high friction resilient material formed on a lower surface thereof; and
   means for hingedly mounting said top cover to said base member, whereby a first species of optical fibers disposed in the first grooves may be coupled to a second species of optical fibers in the second grooves.

2. Apparatus according to claim 1, wherein the first diameter of said first grooves is sufficient to permit multicore type optical fibers to be tightly received in said first grooves.

3. Apparatus according to claim 2, wherein the second diameter of said second grooves is sufficient to permit single core optical fiber cores to be tightly received in said second grooves, whereby said single core fiber cores may be optically connected to said multicore type optical fibers in said first grooves.

4. Apparatus according to claim 2, wherein the second diameter of said second grooves is the same as the first diameter of said first grooves, whereby two multicore type optical fibers may be coupled together.

5. Apparatus according to claim 1, wherein the first diameter of said first grooves is sufficient to permit single core optical fiber cores to be received tightly therein, and the second diameter of said second grooves is sufficient to tightly receive optical fiber glass means therein, whereby said glass means may be coupled to said fiber cores.

* * * * *